US011143468B2

(12) United States Patent
Najafifard (10) Patent No.: US 11,143,468 B2
(45) Date of Patent: Oct. 12, 2021

(54) PULSING ADIABATIC GAS COOLER (71) Applicant: Heatcraft Refrigeration Products LLC, Stone Mountain, GA (US)

(72) Inventor: Fardis Najafifard, Decatur, GA (US)

(73) Assignee: Heatcraft Refrigeration Products LLC, Stone Mountain, GA (US)

(*) Notice: Subject to any disclaimer, the term of this patent is extended or adjusted under 35 U.S.C. 154(b) by 0 days.

(21) Appl. No.: 15/477,634

(22) Filed: Apr. 3, 2017

(65) Prior Publication Data

US 2018/0283814 A1    Oct. 4, 2018

(51) Int. Cl.
| | |
|---|---|
| *F28F 25/00* | (2006.01) |
| *F28F 27/00* | (2006.01) |
| *F28C 1/14* | (2006.01) |
| *F28F 25/02* | (2006.01) |
| *F28F 25/06* | (2006.01) |

(Continued)

(52) U.S. Cl.
CPC .......... *F28F 27/003* (2013.01); *F24F 5/0035* (2013.01); *F24F 11/87* (2018.01); *F28B 1/02* (2013.01); *F28B 1/06* (2013.01); *F28C 1/14* (2013.01); *F28F 25/02* (2013.01);
(Continued)

(58) Field of Classification Search
CPC .......... F28F 27/02; F28F 25/06; F28F 27/003; F28F 25/02; F28F 27/00; F28F 25/00; F28D 1/02; F28D 1/024; F24F 2001/0092; F24F 2110/12; F24F 11/87; F24F 5/0035; F24F 11/83; F24F 6/12; F28B 1/06; F28C 1/14
See application file for complete search history.

(56) References Cited

U.S. PATENT DOCUMENTS

| | | |
|---|---|---|
| 3,785,626 A | 1/1974 | Bradley, Jr. et al. |
| 3,907,942 A | 9/1975 | Bradley, Jr. et al. |

(Continued)

FOREIGN PATENT DOCUMENTS

| | | |
|---|---|---|
| CN | 1712828 A | 12/2005 |
| CN | 1997442 A | 7/2007 |

(Continued)

OTHER PUBLICATIONS

European Patent Office, Extended European Search Report, Application No. 181655119.9, dated Aug. 2, 2018, 9 pages.

(Continued)

*Primary Examiner* — Harry E Arant
(74) *Attorney, Agent, or Firm* — Baker Botts L.L.P.

(57) ABSTRACT

A method by a controller of a cooling system includes calculating a difference between a first temperature of ambient air and a second temperature of pre-cooled air. The pre-cooled air is ambient air that has been cooled by water from a water distribution system before it enters one or more condenser coils. The method further includes determining that the difference between the first and second temperatures is less than or equal to a predetermined temperature difference, and in response, determining that the first temperature is greater than or equal to a minimum temperature. The method further includes, if the first temperature is greater than or equal to the minimum temperature, instructing the water distribution system to distribute the water to pre-cool the ambient air for a predetermined length of time and to disable the distribution of the water after the predetermined amount of time has elapsed.

18 Claims, 3 Drawing Sheets

(51) Int. Cl.
    *F24F 5/00*         (2006.01)
    *F28B 1/02*         (2006.01)
    *F28B 1/06*         (2006.01)
    *F24F 11/87*       (2018.01)
    *F24F 110/12*     (2018.01)
    *F24F 11/83*       (2018.01)
    *F24F 6/12*         (2006.01)

(52) U.S. Cl.
    CPC ................ *F28F 25/06* (2013.01); *F24F 6/12* (2013.01); *F24F 11/83* (2018.01); *F24F 2110/12* (2018.01)

(56) References Cited

U.S. PATENT DOCUMENTS

| | | | |
|---|---|---|---|
| 3,911,060 A | 10/1975 | Bradley, Jr. et al. | |
| 5,383,339 A | 1/1995 | McCloskey et al. | |
| 5,386,709 A | 2/1995 | Aaron | |
| 5,390,505 A | 2/1995 | Smith et al. | |
| 5,598,971 A * | 2/1997 | Winther | B01F 3/04021 236/44 A |
| 6,213,200 B1 | 4/2001 | Carter et al. | |
| 6,564,864 B2 | 5/2003 | Carter et al. | |
| 7,131,639 B2 | 11/2006 | Kammerzell et al. | |
| 8,676,385 B2 | 3/2014 | Myers et al. | |
| 9,243,847 B2 | 1/2016 | Benz et al. | |
| 10,132,577 B2 | 11/2018 | Martell et al. | |
| 2005/0012230 A1 | 1/2005 | Kammerzell et al. | |
| 2008/0104980 A1* | 5/2008 | Payton | F24F 1/42 62/171 |
| 2013/0186611 A1* | 7/2013 | Schneider | F24F 11/0008 165/226 |
| 2015/0204626 A1* | 7/2015 | Martell | F28F 27/00 165/200 |
| 2016/0085248 A1* | 3/2016 | Gordon | G05D 23/1917 700/276 |

FOREIGN PATENT DOCUMENTS

| | | |
|---|---|---|
| CN | 201173554 Y | 12/2008 |
| CN | 106415141 A | 2/2017 |
| JP | H09113005 A | 5/1997 |
| JP | 325587 B2 * | 12/1998 |
| WO | 2015108603 A1 | 7/2015 |

OTHER PUBLICATIONS

China National Intellectual Property Administration, Chinese First Office Action, Application No. 201810285283.7, dated Dec. 25, 2020, 25 pages.

* cited by examiner

PULSING ADIABATIC GAS COOLER

TECHNICAL FIELD

This disclosure relates in general to gas coolers, and more particularly to a pulsing adiabatic gas cooler.

BACKGROUND

Cooling systems are used in many types of residential and commercial applications. As one example, commercial refrigeration systems are used by many types of businesses such as supermarkets and warehouses. Many cooling systems utilize adiabatic cooling processes where water is utilized to cool air before it enters an outdoor condenser unit. Such systems may be inefficient and wasteful of water resources.

SUMMARY

According to one embodiment, an evaporative cooling system includes a plurality of condenser coils, a water distribution system, a plurality of sensors, and a controller. The water distribution system is operable to provide a spray of water to pre-cool ambient air before it enters the condenser coils. The plurality of sensors includes a first sensor and a second sensor. The first sensor is operable to sense a first temperature of the ambient air. The second sensor is operable to sense a second temperature of the pre-cooled air. The controller is communicatively coupled to the water distribution system and the first and second sensors. The controller is operable to calculate an amount of temperature difference between the first and second temperatures and to determine that the amount of temperature difference between the first and second temperatures is less than or equal to a predetermined temperature difference. The controller is further operable to, in response to determining that the amount of temperature difference between the first and second temperatures is less than or equal to the predetermined temperature difference, determine that the first temperature is greater than or equal to a minimum temperature. The controller is further operable to, in response to determining that the first temperature is greater than or equal to the minimum temperature, instruct the water distribution system to enable the spray of water to spray for a predetermined length of time. The controller is further operable to instruct the water distribution system to disable the spray of water after the predetermined amount of time has elapsed.

According to another embodiment, a method implemented by a controller of a cooling system includes calculating an amount of temperature difference between a first temperature of ambient air and a second temperature of pre-cooled air. The pre-cooled air comprises ambient air that has been cooled by water from a water distribution system before it enters one or more condenser coils. The method further includes determining that the amount of temperature difference between the first and second temperatures is less than or equal to a predetermined temperature difference. The method further includes, in response to determining that the amount of temperature difference between the first and second temperatures is less than or equal to the predetermined temperature difference, determining that the first temperature is greater than or equal to a minimum temperature. The method further includes, in response to determining that the first temperature is greater than or equal to the minimum temperature, instructing the water distribution system to distribute the water to pre-cool the ambient air for a predetermined length of time. The method further includes instructing the water distribution system to disable the distribution of the water after the predetermined amount of time has elapsed.

Technical advantages of certain embodiments may include providing enhanced functionality in an evaporative or adiabatic cooling system that permits the system to run more efficiently, thereby conserving resources such as electricity and natural gas. In addition, the enhanced functionality provided to evaporative or adiabatic cooling systems by enclosed embodiments reduces water usage and waste, thereby conserving natural resources. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Gas cooling systems are used in many types of residential and commercial applications. As one example, commercial refrigeration systems are used by many types of businesses such as supermarkets and warehouses. Many cooling systems utilize adiabatic cooling processes where water is utilized to pre-cool air before it enters an outdoor condenser unit. For example, large commercial refrigeration systems may utilize cooling towers where water is used to pre-cool air before it flows through condenser coils. While pre-cooling air with water aids in the overall efficiency of cooling systems, many such systems continue to spray or otherwise use water when it is not needed. As one example, many systems continue to spray water when it is raining. This wastes water resources and contributes to the overall inefficiency of the system.

To address these and other problems with certain gas cooling systems, embodiments of the disclosure utilize at least two sensors to determine when to utilize water to pre-cool air before it enters condenser coils. For example, some embodiments compare temperatures of ambient and pre-cooled air and then only spray water when the difference between the two temperatures becomes lower than a certain amount. This selective "pulsing" of water enables adiabatic gas cooling systems to conserve resources such as water and electricity and therefore have greater efficiency. The following describes pulsing adiabatic gas cooler systems and methods for providing these and other desired features.

Figure 1:
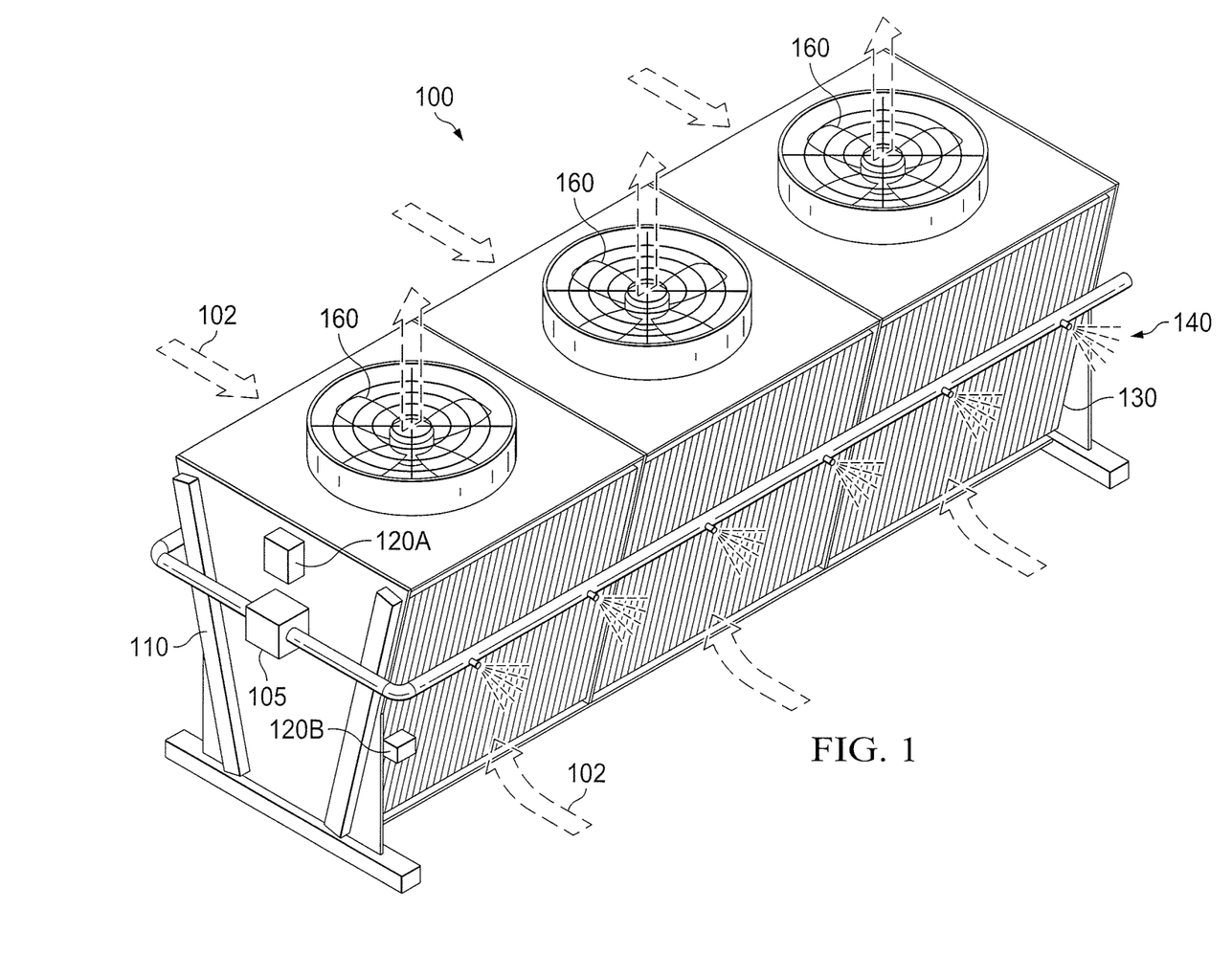
FIG. 1 illustrates a gas cooling system, according to certain embodiments.
Figure 2:
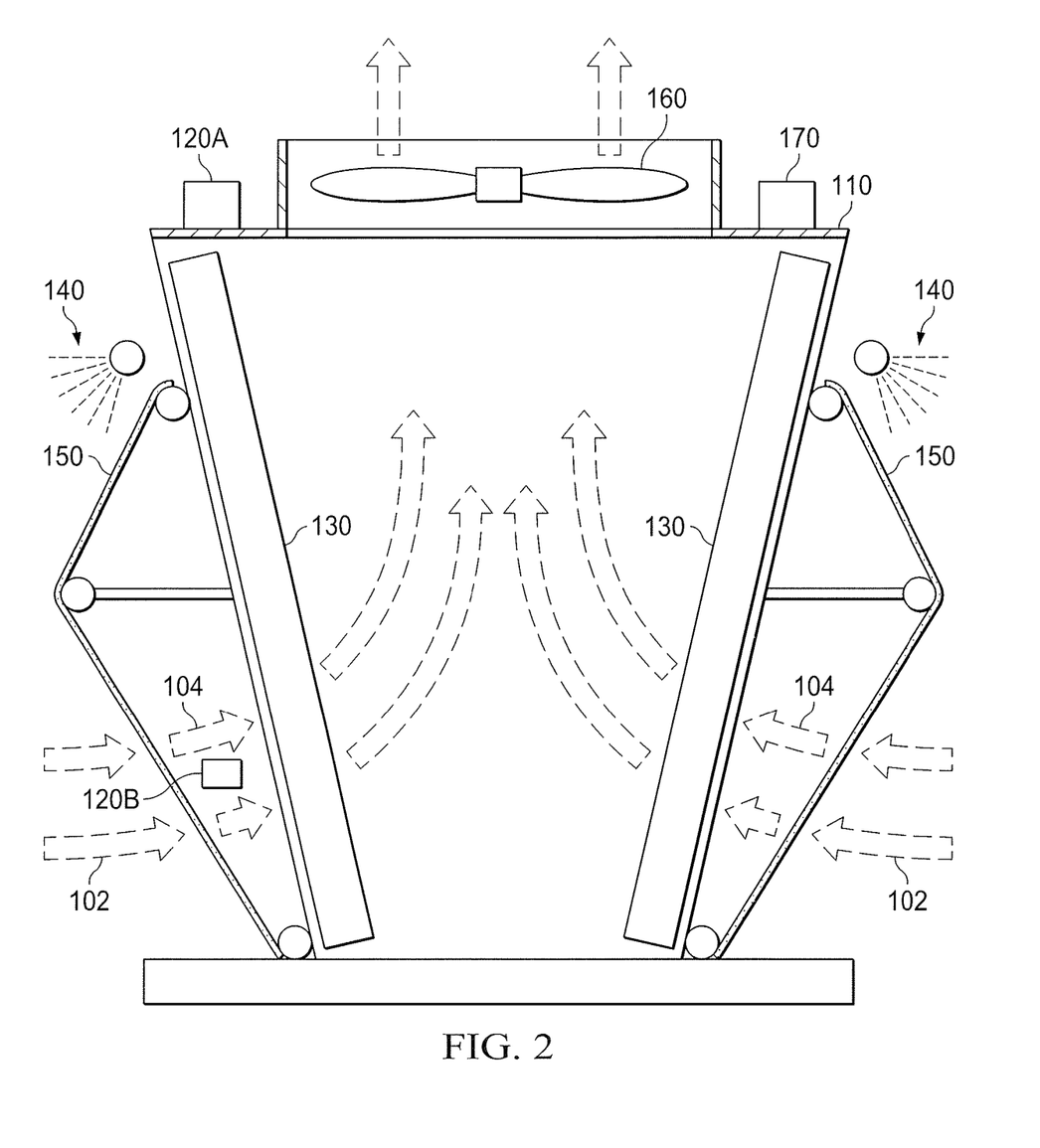
FIG. 2 illustrates a side view of the gas cooling system of FIG. 1, according to certain embodiments.

FIGS. 1 and 2 illustrate portions of a gas cooling system 100, according to certain embodiments. In some embodiments, gas cooling system 100 includes a water distribution system 105, a condenser unit 110, two or more sensors 120, condenser coils 130, a fan 160, and a controller 170. Water distribution system 105 provides water to gas cooling system 100 via, for example, a water spray 140. Water from water distribution system 105 generates pre-cooled air 104 by cooling ambient air 102 before it enters condenser unit 110. Controller 170 is communicatively coupled to sensors 120 and water distribution system 105 and controls functions of gas cooling system 100 as described herein.

In general, gas cooling system 100 utilizes information from sensors 120 to control when to utilize water spray 140 to pre-cool ambient air 102 before it enters condenser unit 110. In some embodiments, for example, controller 170 may determine a temperature of ambient air 102 from a first sensor 120A, and a temperature of pre-cooled air 104 from a second sensor 120B. Controller 170 may then calculate a temperature difference between the temperature of ambient air 102 and the temperature of pre-cooled air 104. Controller 170 may then instruct water distribution system 105 to provide water spray 140 only when the temperature difference becomes lower than a certain pre-set temperature. The pre-set temperature may be set depending on the overall design of gas cooling system 100 and the specific geographic location of gas cooling system 100. As a specific example, water spray 140 may only be enabled when the temperature difference becomes lower than 5° F. Controller 170 may then instruct water distribution system 105 to disable water spray 140 after spraying for a specific amount of time (e.g., one minute). By utilizing water from water distribution system 105 to pre-cool ambient air 102 only under certain conditions, gas cooling system 100 conserves resources such as water and electricity.

Condenser unit 110 is any typical unit used to cool a refrigerant by condensing it from its gaseous state to its liquid state. In most commercial refrigeration applications, condenser unit 110 is located outdoors and is fluidly coupled to indoor portions of gas cooling system 100 (e.g., air handlers) via one or more refrigerant lines. In some embodiments, condenser unit 110 is a cooling tower. Condenser unit 110 typically includes multiple condenser coils 130 and motors that turn fans 160. Fans 160 draw ambient air 102 or pre-cooled air 104 through condenser coils 130, thereby cooling and condensing the refrigerant and providing cooling to gas cooling system 100.

Water distribution system 105 is any appropriate system capable of delivering water to condenser unit 110. In some embodiments, water distribution system 105 includes one or more pumps. In some embodiments, water distribution system 105 provides one or more water sprays 140 that are directed to an area around condenser unit 110 in order to pre-cool ambient air 102 before it enters condenser unit 110. While a specific configuration of water distribution system 105 and water spray 140 is illustrated in FIG. 1, any appropriate configuration known in the art may be utilized.

Sensors 120 are any appropriate sensors for sensing and detecting conditions of air. In some embodiments, sensors 120 are thermometers. In other embodiments, sensors 120 are capable of sensing conditions in addition to temperature (e.g., humidity). In the illustrated embodiments, gas cooling system 100 includes two sensors 120: first sensor 120A and second sensor 120B. Sensor 120A is located in any appropriate location to sense conditions of ambient air 102. In some embodiments, sensor 120A is coupled to or located within condenser unit 110, but in other embodiments may be located remotely from condenser unit 110. Sensor 120B is located in any appropriate location to sense conditions of pre-cooled air 104. In some embodiments, sensor 120B does not get wet from water from water distribution system 105. As illustrated in FIG. 2, some embodiments may include sensor 120B that is located proximate to condenser coils 130 within the flow of pre-cooled air 104 (e.g., before pre-cooled air 104 enters condenser coils 130). In other embodiments, sensor 120B may be installed in a location in which it gets wet from water from water distribution system 105. Sensors 120 may store measured air conditions either internally (e.g., in internal memory) or in memory that is remote from sensors 120 (e.g., within controller 170).

In some embodiments, condenser unit 110 may include one or more panels 150 for use in generating pre-cooled air 104, as illustrated in FIG. 2. Each panel 150 may be any appropriate material that is capable of receiving and retaining water from water distribution system 105. As a specific example, panel 150 may be a mesh material through which ambient air 102 passes before it enters condenser coils 130. As ambient air 102 passes through the wet mesh material of panel 150, it cools and becomes pre-cooled air 104. Panels 150 may be in any appropriate configuration and are not limited to those illustrated in FIG. 2. For example, panels 150 may be affixed directly to the side of condenser coils 130 in some embodiments.

Controller 170 is any appropriate device or circuitry that controls functions of gas cooling system 100. Controller 170 may be within or coupled to condenser unit 110, or it may be separate from condenser unit 110 in some embodiments. In some embodiments, controller 170 is a circuit board within condenser unit 110.

In some embodiments, controller 170 includes an interface, one or more memory devices, and a processor. Controller 170 may also include additional components typically included within a controller for a cooling system, such as a power supply, relays, and the like. The interface of controller 170 may be a conventional interface that is used to receive and transmit data for a controller, such as a micro-controller.

The one or more memory devices of controller 170 may store operating instructions to direct the operation of the processor of controller 170 when initiated thereby. In some embodiments, the memory of controller 170, or at least of portion thereof, is a non-volatile memory. The operating instructions may correspond to algorithms that provide the functionality of the methods and algorithms disclosed herein. For example, the operating instructions may correspond to the algorithm or algorithms that implement the methods illustrated in FIG. 3. In some embodiments, the processor of controller 170 may be a microprocessor. The interface, processor, and memory of controller 170 may be coupled together via conventional means to communicate information.

In operation, gas cooling system 100 utilizes information from sensors 120 (e.g., temperatures) to control when to utilize water from water distribution system 105 to pre-cool ambient air 102 before it enters condenser unit 110. In some embodiments, for example, controller 170 may determine a temperature of ambient air 102 from first sensor 120A and a temperature of pre-cooled air 104 from second sensor 120B. Controller 170 may then calculate a temperature difference between the temperature of ambient air 102 and the temperature of pre-cooled air 104. Controller 170 may then instruct water distribution system 105 to provide water (e.g., water spray 140) only when the temperature difference becomes equal to or lower than a certain pre-set temperature. Controller 170 may then then instruct water distribution system 105 to disable water spray 140 after spraying for a specific amount of time (e.g., one minute).

In some embodiments, controller 170 instructs water distribution system 105 to provide water spray 140 when the difference between the temperature of ambient air 102 and pre-cooled air 104 becomes lower than 5° F. However, this pre-set temperature is configurable and may depend on various factors such as the overall design of gas cooling system 100 and the specific geographic location of gas cooling system 100. As an example, if gas cooling system 100 is located in a hot, dry environment, water spray 140 may be enabled when the temperature difference becomes lower than 7° F. As another example, if gas cooling system 100 is located in a cool, wet environment, water spray 140 may be enabled when the temperature difference becomes lower than 3° F. In some embodiments, controller 170 may automatically determine the pre-set temperature using information such as GPS coordinates obtained wirelessly using a receiver. In other embodiments, an operator may configure the pre-set temperature using a user interface. While specific pre-set temperatures have been listed herein, the pre-set temperature may be any appropriate temperature to operate gas cooling system 100 efficiently (e.g., 0.1-0.9 degrees, 1.0-9.9 degrees, etc.).

Figure 3:
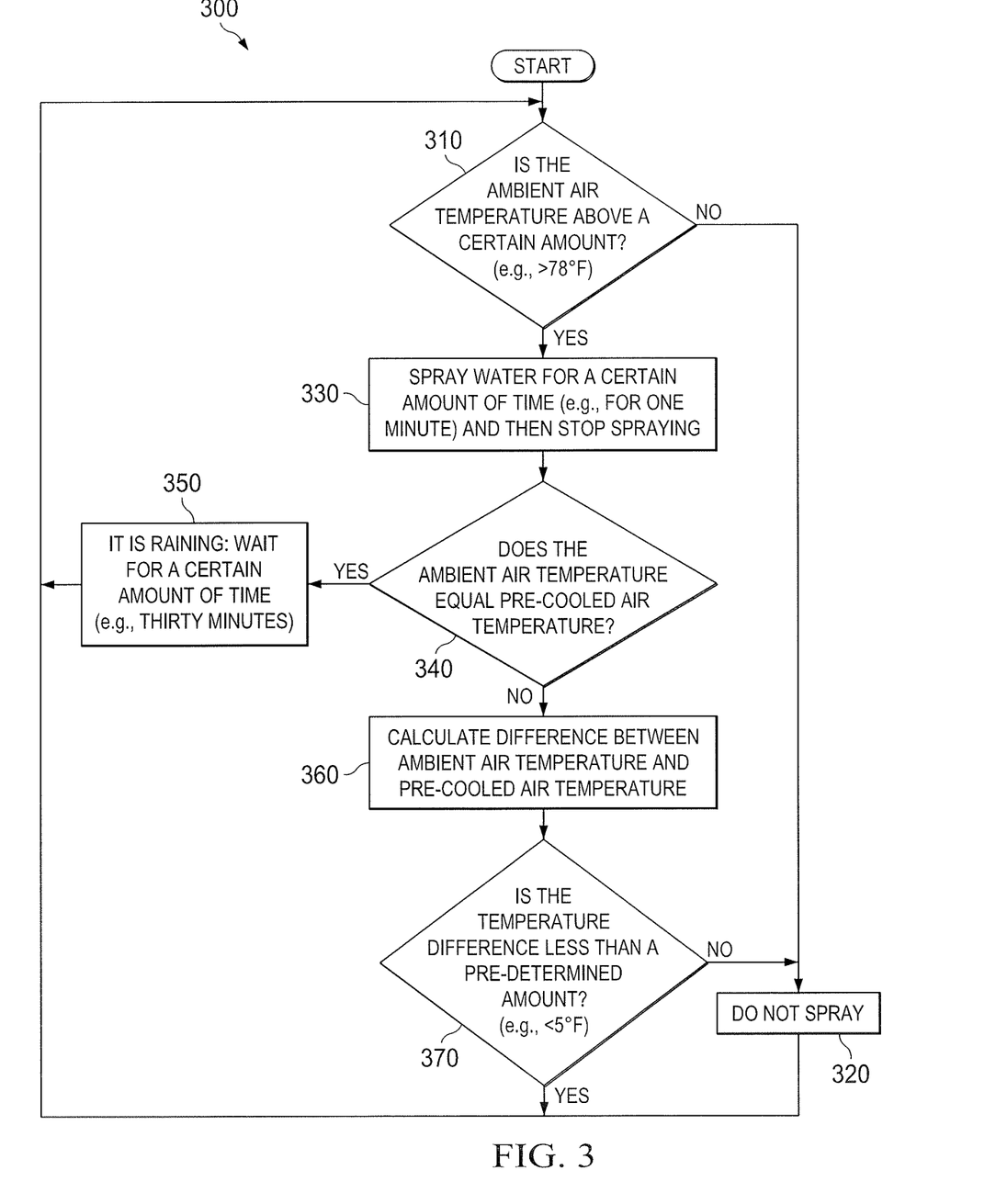
FIG. 3 illustrates a method that may be utilized by the gas cooling system of FIG. 1 to conserve resources, according to certain embodiments.

FIG. 3 illustrates an example method 300 that may be utilized by gas cooling system 100 of FIG. 1 to control when water from water distribution system 105 is utilized to pre-cool ambient air 102, thereby providing pre-cooled air 104 to condenser coils 130. Method 300 may begin in step 310 where it is determined whether a temperature of the ambient air is greater than or equal to a minimum temperature. In some embodiments, the temperature of the ambient air is determined from a sensor such as first sensor 120A. In some embodiments, the minimum temperature is a pre-set minimum temperature (e.g., 78° F.). The pre-set minimum temperature may be configurable in some embodiments. For example, an operator may configure the pre-set minimum temperature using a user interface. If the temperature of the ambient air is greater than or equal to the minimum temperature, method 300 proceeds to step 330. Otherwise, if the temperature of the ambient air is less than the minimum temperature, method 300 proceeds to step 320.

In some embodiments, step 310 may alternatively include determining an amount of humidity of ambient air 102. For example, sensor 120A may include a humidity sensor that senses the amount of humidity of ambient air 102. Controller 170 may determine the amount of humidity of ambient air 102 from sensor 120A and then use it to determine whether to proceed to step 320 or 330. For example, if the amount of humidity from sensor 120A is 100% (or greater than a configurable amount of humidity such as 95% humidity), method 300 may proceed to step 320 where water is not utilized to pre-cool the ambient air. Otherwise, if the amount of humidity from sensor 120A is less than 100% (or less than a configurable amount of humidity such as 95% humidity), method 300 may proceed to step 330 where water is utilized to pre-cool the ambient air.

At step 320, method 300 instructs a water distribution such as water distribution system 105 not to distribute water to the cooling system. For example, controller 170 may instruct water distribution system 105 in this step to disable water spray 140. After step 320, method 300 proceeds back to the start of method 300 (e.g., step 310).

At step 330, method 300 instructs a water distribution such as water distribution system 105 to distribute water to the cooling system for a certain amount of time. For example, controller 170 may instruct water distribution system 105 in this step to enable water spray 140 for a predetermined length of time (e.g., one minute). The length of time that water spray 140 is enabled in this step may be configurable in some embodiments. For example, an operator may configure the predetermined length of time using a user interface. After the predetermined length of time has elapsed, controller 170 instructs water distribution system 105 to disable water spray 140.

At step 340, method 300 determines whether the ambient air temperature equals a temperature of the pre-cooled air. In some embodiments, the temperature of the ambient air (e.g., ambient air 102) is determined by first sensor 120A, and the temperature of the pre-cooled air (e.g., pre-cooled air 104) is determined by second sensor 120B. In some embodiments, the ambient air temperature is determined to equal the temperature of the pre-cooled air in this step if the ambient air temperature is substantially equal to the temperature of the pre-cooled air (e.g., within 0-5% of the temperature of the pre-cooled air). In other embodiments, controller 170 may utilize other methods to determine if it is raining in step 340. For example, controller 170 may receive weather information from a rain sensor or other sources (e.g., weather radar information from the Internet or from a radio receiver) in order to determine whether it is currently raining. If it is determined in this step that the ambient air temperature equals or substantially equals the temperature of the pre-cooled air, method 300 determines that it is currently raining and proceeds to step 350. If it is determined in this step that the ambient air temperature does not equal or substantially equal the temperature of the pre-cooled air, method 300 proceeds to step 360.

In some embodiments, controller 170 may utilize other methods to determine if it is raining in step 340. For example, controller 170 may receive weather information from a rain sensor or other sources (e.g., weather radar information from the Internet or from a radio receiver) in order to determine whether it is currently raining. If it is determined in step 340 that it is raining, method 300 proceeds to step 350. If it is determined in this step that it is not raining, method 300 proceeds to step 360.

At step 350, method 300 waits for a certain amount of time and then proceeds back to the start of method 300 (e.g., step 310). For example, method 300 may wait thirty minutes in this step before proceeding back to step 310. Other embodiments may wait other amounts of time. Waiting a certain amount of time in this step may allow it to stop raining. The length of time that method 300 waits in step 350 may be configurable in some embodiments. For example, an operator may configure the amount of wait time using a user interface. In other embodiments, controller 170 may utilize similar methods as described above in step 340 to determine if it is still raining and then automatically adjust the amount of time to wait in step 350. More specifically, controller 170 may receive weather information from a rain sensor or other sources (e.g., weather radar information from the Internet or from a radio receiver) in order to determine whether it is currently still raining and then adjust the amount of time to wait in step 350. For example, controller 170 may start a countdown timer when entering step 350. Once the timer has counted a certain amount of time (e.g., thirty minutes), controller 170 may communicate with a rain sensor to determine if it is still raining in this step. If controller 170 determines that it is still raining, controller 170 may return to the beginning of step 350 (e.g, restart the countdown timer).

At step 360, method 300 calculates an amount of temperature difference between the ambient air temperature and the pre-cooled air temperature. For example, controller 170 may determine a first temperature of ambient air 102 from sensor 120A and a second temperature of pre-cooled air 104 from sensor 120B and then calculate an amount of difference between the first and second temperatures. After calculating the temperature difference between the ambient air temperature and the pre-cooled air temperature, method 300 proceeds to step 370.

At step 370, method 300 determines whether the amount of temperature difference between the ambient air temperature and the pre-cooled air temperature calculated in step 360 is less than or equal to a predetermined temperature difference. In some embodiments, the predetermined temperature difference is 5° F. However, this predetermined temperature difference is configurable (e.g., automatically by controller 170 or by an operator) and may depend on various factors such as the overall design of the system and the specific geographic location of the system. If it is determined in step 370 that the amount of temperature difference between the ambient air temperature and the pre-cooled air temperature is less than or equal to the predetermined temperature difference, method 300 proceeds back to step 310. If it is determined in step 370 that the amount of temperature difference between the ambient air temperature and the pre-cooled air temperature is greater than the predetermined temperature difference, method 300 proceeds back to step 320.

Some embodiments may utilize alternate methods for various steps of method 300. As one example, some embodiments may in steps 360 and 370 utilize a calculated temperature difference between a wet bulb temperature and the pre-cooled air temperature to determine when to spray water using water distribution system 105. As another example, some embodiments may in steps 360 and 370 utilize changes to refrigerant outlet temperatures or pressure to determine when to spray water using water distribution system 105. Some embodiments may use compressor(s) power usage or frequency to determine when to spray water using water distribution system 105. Some embodiments may use a humidity sensor at the air outlet of gas cooling system 100 to determine when to spray water using water distribution system 105.

Particular embodiments may repeat one or more steps of method 300 of FIG. 3, where appropriate. Although this disclosure describes and illustrates particular steps of method 300 of FIG. 3 as occurring in a particular order, this disclosure contemplates any suitable steps of method 300 occurring in any suitable order. Moreover, although this disclosure describes and illustrates particular steps of method 300 of FIG. 3, this disclosure contemplates any suitable method for controlling water flow in gas cooling system including any suitable steps, which may include all, some, or none of the steps of method 300, where appropriate. Furthermore, although this disclosure describes and illustrates particular components, devices, or systems carrying out particular steps of method 300, this disclosure contemplates any suitable combination of any suitable components, devices, or systems carrying out any suitable steps of method 300.

The components of gas cooling system 100 may be integrated or separated. In some embodiments, components of gas cooling system 100 may each be housed within a single enclosure. The operations of gas cooling system 100 may be performed by more, fewer, or other components. Additionally, operations of gas cooling system 100 may be performed using any suitable logic that may comprise software, hardware, other logic, one or more processors, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An evaporative cooling system, comprising:
   a plurality of condenser coils;
   one or more panels affixed to the plurality of condenser coils, wherein each panel of the one or more panels is operable to receive and retain water provided by a water distribution system;
   the water distribution system operable to provide a spray of water to pre-cool ambient air before the ambient air enters the plurality of condenser coils, wherein the water distribution system comprises a plurality of spray nozzles, each spray nozzle configured, when the water distribution system is providing the spray of water, to provide a corresponding portion of the spray of water away from the one or more panels;
   a plurality of sensors comprising:
     a first sensor operable to sense a first temperature of the ambient air; and
     a second sensor operable to sense a second temperature of the pre-cooled air; and
   a controller communicatively coupled to the water distribution system and the first and second sensors, the controller operable to:
     calculate an amount of temperature difference between the first and second temperatures;

determine a predetermined temperature difference based on a geographical location of the evaporative cooling system;

determine that the amount of temperature difference between the first and second temperatures is less than or equal to the predetermined temperature difference;

in response to determining that the amount of temperature difference between the first and second temperatures is less than or equal to the predetermined temperature difference, determine that the first temperature is greater than or equal to a minimum temperature;

in response to determining that the first temperature is greater than or equal to the minimum temperature, instruct the water distribution system to enable the spray of water to spray for a predetermined length of time; and instruct the water distribution system to disable the spray of water after the predetermined amount of time has elapsed;

the controller further operable to:

determine that it is raining by receiving weather information from a rain sensor or other source of weather information;

in response to determining that it is raining, instruct the water distribution system to disable the spray of water for a certain amount of time.

2. The evaporative cooling system of claim 1, wherein:
the predetermined temperature difference is five degrees Fahrenheit; and
the minimum temperature is 78 degrees Fahrenheit.

3. The evaporative cooling system of claim 1, wherein the predetermined length of time is one minute.

4. The evaporative cooling system of claim 1, the controller further operable to:
determine that the amount of temperature difference between the first and second temperatures is greater than the predetermined amount; and
in response to determining that the amount of temperature difference between the first and second temperatures is greater than the predetermined amount, instruct the water distribution system to disable the spray of water.

5. The evaporative cooling system of claim 1, the controller further operable to:
determine that it is raining by determining that the first temperature equals the second temperature; and
in response to determining that the first temperature equals the second temperature, instruct the water distribution system to disable the spray of water for a certain amount of time.

6. The evaporative cooling system of claim 1, the controller further operable to:
determine that the first temperature is less than the minimum temperature; and
in response to determining that the first temperature is less than the minimum temperature, instruct the water distribution system to disable the spray of water.

7. The evaporative cooling system of claim 1, wherein the controller is further operable to determine the geographical location of the evaporative cooling system using GPS coordinates.

8. The evaporative cooling system of claim 1, wherein the predetermined temperature difference is between 0.1 and 9.9 degrees Fahrenheit.

9. A method, comprising:
by a controller of a cooling system, calculating an amount of temperature difference between a first temperature of ambient air and a second temperature of pre-cooled air, the pre-cooled air comprising ambient air that has been cooled by water from a water distribution system before the ambient air enters one or more condenser coils of the cooling system, wherein the cooling system comprises one or more panels affixed to the one or more condenser coils, wherein each panel of the one or more panels is operable to receive and retain water provided by the water distribution system;

by the controller of the cooling system, determining a predetermined temperature difference based on a geographical location of the cooling system;

by the controller of the cooling system, determining that the amount of temperature difference between the first and second temperatures is less than or equal to the predetermined temperature difference;

by the controller of the cooling system, in response to determining that the amount of temperature difference between the first and second temperatures is less than or equal to the predetermined temperature difference, determining that the first temperature is greater than or equal to a minimum temperature;

by the controller of the cooling system, in response to determining that the first temperature is greater than or equal to the minimum temperature, instructing the water distribution system to distribute the water to pre-cool the ambient air for a predetermined length of time, wherein distributing the water comprises providing, from each of a plurality of spray nozzles of the water distribution system, a portion of the distributed water away from the one or more panels affixed to the one or more condenser coils; and by the controller of the cooling system, instructing the water distribution system to disable the distribution of the water after the predetermined amount of time has elapsed;

by the controller of the cooling system, determining that it is raining by receiving weather information from a rain sensor or other source of weather information; and by the controller of the cooling system, in response to determining that it is raining, instruct the water distribution system to disable the spray of water for a certain amount of time.

10. The method of claim 9, wherein:
the predetermined temperature difference is five degrees Fahrenheit; and
the minimum temperature is 78 degrees Fahrenheit.

11. The method of claim 9, further comprising:
by the controller of the cooling system, determining that the amount of temperature difference between the first and second temperatures is greater than the predetermined amount; and
by the controller of the cooling system, in response to determining that the amount of temperature difference between the first and second temperatures is greater than the predetermined amount, instructing the water distribution system to disable the spray of water.

12. The method of claim 9, further comprising:
by the controller of the cooling system, determining that it is raining by determining that the first temperature equals the second temperature; and
by the controller of the cooling system, in response to determining that the first temperature equals the second temperature, instructing the water distribution system to disable the spray of water for a certain amount of time.

13. The method of claim 9, further comprising:
by the controller of the cooling system, determining that the first temperature is less than the minimum temperature; and
by the controller of the cooling system, in response to determining that the first temperature is less than the minimum temperature, instructing the water distribution system to disable the spray of water.

14. One or more computer-readable non-transitory storage media in one or more computing systems, the media embodying logic that is operable when executed to:
calculate an amount of temperature difference between a first temperature of ambient air and a second temperature of pre-cooled air, the pre-cooled air comprising ambient air that has been cooled by water from a water distribution system before the ambient air enters one or more condenser coils of a cooling system, wherein the cooling system comprises one or more panels affixed to the one or more condenser coils, wherein each panel of the one or more panels is operable to receive and retain water provided by the water distribution system;
determine a predetermined temperature difference based on a geographical location of the cooling system;
determine that the amount of temperature difference between the first and second temperatures is less than or equal to the predetermined temperature difference;
in response to determining that the amount of temperature difference between the first and second temperatures is less than or equal to the predetermined temperature difference, determine that the first temperature is greater than or equal to a minimum temperature;
in response to determining that the first temperature is greater than or equal to the minimum temperature, instruct the water distribution system to distribute the water to pre-cool the ambient air for a predetermined length of time, wherein distributing the water comprises providing, from each of a plurality of spray nozzles of the water distribution system, a portion of the distributed water away from the one or more panels affixed to the one or more condenser coils;
instruct the water distribution system to disable the distribution of the water after the predetermined amount of time has elapsed;
determine that it is raining by receiving weather information from a rain sensor or other source of weather information; and
in response to determining that it is raining, instruct the water distribution system to disable the spray of water for a certain amount of time.

15. The media of claim 14, wherein:
the predetermined temperature difference is five degrees Fahrenheit;
the minimum temperature is 78 degrees Fahrenheit; and
the predetermined length of time is one minute.

16. The media of claim 14, the logic further operable when executed to:
determine that the amount of temperature difference between the first and second temperatures is greater than the predetermined amount; and
in response to determining that the amount of temperature difference between the first and second temperatures is greater than the predetermined amount, instruct the water distribution system to disable the spray of water.

17. The media of claim 14, the logic further operable when executed to:
determine that it is raining by determining that the first temperature equals the second temperature; and
by the control unit of the cooling system, in response to determining that the first temperature equals the second temperature, instruct the water distribution system to disable the spray of water for a certain amount of time.

18. The media of claim 14, the logic further operable when executed to:
determine that the first temperature is less than the minimum temperature; and
in response to determining that the first temperature is less than the minimum temperature, instruct the water distribution system to disable the spray of water.

* * * * *